United States Patent
Hecht et al.

(10) Patent No.: US 9,993,876 B2
(45) Date of Patent: Jun. 12, 2018

(54) CUTTING TOOL HOLDER WITH VIBRATION DAMPING WEIGHT ASSEMBLY

(71) Applicant: Iscar, Ltd., Tefen (IL)

(72) Inventors: Gil Hecht, Nahariya (IL); Ofir Zagagy, Kiryat Ata (IL); Jony Saffouri, Nazareth Elit (IL); Ilya Men, Haifa (IL)

(73) Assignee: Iscar, Ltd., Tefen (IL)

( * ) Notice: Subject to any disclaimer, the term of this patent is extended or adjusted under 35 U.S.C. 154(b) by 253 days.

(21) Appl. No.: 14/976,442

(22) Filed: Dec. 21, 2015

(65) Prior Publication Data
US 2017/0173701 A1    Jun. 22, 2017

(51) Int. Cl.
*B23B 27/00*    (2006.01)
*B23B 29/02*    (2006.01)
(Continued)

(52) U.S. Cl.
CPC ............ *B23B 27/002* (2013.01); *B23B 27/08* (2013.01); *B23B 27/1666* (2013.01);
(Continued)

(58) Field of Classification Search
CPC . B23B 27/002; B23B 29/043; B23B 2205/02; B23B 27/08; B23B 27/1666;
(Continued)

(56) References Cited

U.S. PATENT DOCUMENTS 3,242,791 A * 3/1966 Smith ................... B23B 29/022
                                                           188/379
3,774,730 A * 11/1973 Maddux ................ B23B 29/022
                                                           188/379
(Continued)

FOREIGN PATENT DOCUMENTS

JP         61257702 A  * 11/1986  ........... B23B 27/002
JP     2003062703 A  *  3/2003
(Continued)

OTHER PUBLICATIONS

International Search Report dated Jul. 27, 2017, issued in PCT counterpart application (No. PCT/IL2016/051326).
(Continued)

*Primary Examiner* — Sara Addisu
(74) *Attorney, Agent, or Firm* — Womble Bond Dickinson (US) LLP (57) ABSTRACT

A cutting tool holder has a holder body and a vibration damping weight assembly. The holder body has opposing first and second side surfaces and a top surface extending therebetween, and an insert mounting portion located at a front end of the holder body adjacent to the top surface. A weight aperture opens out to the first and second side surfaces and has an aperture inner surface. The weight assembly is located within the weight aperture, having a first and second weight portions, a damping ring located along the aperture inner surface, and an actuating member interfacing and urging the first and second weight portions away from one another, such that each weight portion presses against the damping ring within the weight aperture.

24 Claims, 4 Drawing Sheets

(51) Int. Cl.
  *B23B 27/16* (2006.01)
  *B23B 29/12* (2006.01)
  *B23B 27/08* (2006.01)
  *B23B 29/04* (2006.01)

(52) U.S. Cl.
  CPC ............ *B23B 29/043* (2013.01); *B23B 29/12* (2013.01); *B23B 2205/02* (2013.01); *B23B 2250/16* (2013.01)

(58) Field of Classification Search
  CPC ... B23B 29/12; B23B 2250/16; B23B 27/086; B23B 27/083
  See application file for complete search history.

(56) References Cited

U.S. PATENT DOCUMENTS

| | | | | |
|---|---|---|---|---|
| 4,061,438 | A * | 12/1977 | New | B23B 29/022 408/143 |
| 5,074,723 | A * | 12/1991 | Massa | B23B 31/006 279/129 |
| 5,112,164 | A * | 5/1992 | Pano | B23B 27/04 407/110 |
| 6,113,319 | A | 9/2000 | Hansson et al. | |
| 6,186,704 | B1 * | 2/2001 | Hale | B23B 27/04 407/101 |
| 7,780,380 | B2 * | 8/2010 | Nagaya | B23B 29/043 407/101 |
| 8,388,271 | B2 * | 3/2013 | Elbaz | B23B 29/043 407/101 |
| 9,616,502 | B2 * | 4/2017 | Hecht | B23B 27/002 |
| 2003/0147707 | A1 | 8/2003 | Perkowski | |
| 2005/0220552 | A1 * | 10/2005 | Oettle | B23B 29/02 408/239 R |
| 2005/0279598 | A1 * | 12/2005 | McPherson | F16F 7/108 188/378 |
| 2006/0291973 | A1 * | 12/2006 | Claesson | B23B 27/002 409/234 |
| 2007/0210537 | A1 * | 9/2007 | Weller | B23B 31/20 279/43.6 |
| 2008/0025805 | A1 * | 1/2008 | Mihic | B23B 29/00 408/143 |
| 2008/0031699 | A1 * | 2/2008 | Chen | B23B 31/006 409/232 |
| 2011/0116883 | A1 * | 5/2011 | Lin | B23B 27/002 408/143 |
| 2012/0099940 | A1 * | 4/2012 | de Souza Filho | B23B 31/02 409/131 |
| 2013/0206525 | A1 * | 8/2013 | Ogata | B23B 27/002 188/381 |
| 2015/0056025 | A1 * | 2/2015 | Guo | B23C 5/003 407/33 |
| 2015/0231706 | A1 * | 8/2015 | Frank | B23B 29/022 407/32 |
| 2015/0375305 | A1 * | 12/2015 | Frota de Souza Filho | B23B 29/022 408/143 |
| 2016/0045960 | A1 | 2/2016 | Hecht | |
| 2016/0311031 | A1 * | 10/2016 | Giannetti | B23B 29/022 |
| 2017/0197251 | A1 * | 7/2017 | Nakatani | B23B 29/022 |

FOREIGN PATENT DOCUMENTS

| | | | |
|---|---|---|---|
| JP | 2003062704 A * | 3/2003 | |
| JP | 2003-62703 A | 5/2003 | |
| JP | 2004202648 A * | 7/2004 | |
| JP | 2007260892 A * | 10/2007 | ........... B23B 29/043 |
| JP | 2011-42007 A | 3/2011 | |
| JP | 2011042007 A * | 3/2011 | |
| KR | 10-2012-0069195 | 6/2012 | |
| KR | 10-1258519 | 6/2012 | |

OTHER PUBLICATIONS

Written Opinion dated Jul. 27, 2017, issued in PCT counterpart application (No. PCT/IL2016/051326).

* cited by examiner

CUTTING TOOL HOLDER WITH VIBRATION DAMPING WEIGHT ASSEMBLY

FIELD OF THE INVENTION

The present invention relates to cutting tool holders, in general, and to cutting tool holder blades with a weight aperture and vibration damping mechanisms, in particular.

BACKGROUND OF THE INVENTION

Cutting tool holders, especially of the blade holder type, have a cutting insert located at a front end thereof. Performing cutting operations at the front end of the holder blade may cause unwanted vibrations at the cutting end.

Cutting tool holders with vibration damping mechanisms are shown, for example, in JP2003062703A, JP2011042007A, U.S. Pat. No. 6,113,319 and KR101258519.

SUMMARY OF THE INVENTION

In accordance with one aspect of the present invention, there is provided a cutting tool holder comprising:
a holder body having a longitudinal axis, and comprising:
opposing first and second side surfaces and a top surface extending therebetween;
an insert mounting portion located at a front end of the holder body adjacent to the top surface;
a weight aperture opening out to the first and second side surfaces and comprising an aperture inner surface, and an aperture axis extending transversely to the longitudinal axis;
and
a weight assembly located within the weight aperture, and comprising:
a first weight portion;
a second weight portion;
a damping ring located along the aperture inner surface; and
an actuating member interfacing and urging the first and second weight portions away from one another, such that each weight portion presses against the damping ring within the weight aperture.

In accordance with another aspect of the present invention, there is provided a cutting tool holder comprising:
a holder body having a longitudinal axis, and comprising:
opposing first and second side surfaces;
a top surface extending between first and second side surfaces, and having an upper abutment surface;
a bottom surface extending between the first and second side surfaces opposite the top surface, and having a lower abutment surface;
an insert mounting portion located at a front end of the holder body adjacent to the top surface; and
a weight aperture opening out to the first and second side surfaces and comprising an aperture inner surface, and an aperture axis extending transversely to the longitudinal axis; wherein:
the weight aperture is at least partially located in a bottom protuberance which extends downwardly from the lower abutment surface.

In accordance with still another aspect of the present invention, there is provided a cutting tool holder comprising:
a holder body having a longitudinal axis, and comprising:
opposing first and second side surfaces and a top surface extending therebetween;
an insert mounting portion located at a front end of the holder body adjacent to the top surface;
a non-circular weight aperture opening out to the first and second side surfaces and comprising an aperture inner surface; and
an aperture axis extending transversely to the longitudinal axis; and
a weight assembly located within the non-circular weight aperture, the weight assembly comprising at least first and second weight portions, each weight portion being urged in a different direction toward said aperture inner surface.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

In one embodiment, the present invention relates to a cutting tool holder 20 comprising a holder body 22 with a generally elongated shape and a longitudinal axis A1, and a weight aperture 30. A weight assembly 24 may be retained in the weight aperture 30.

Figure 1:
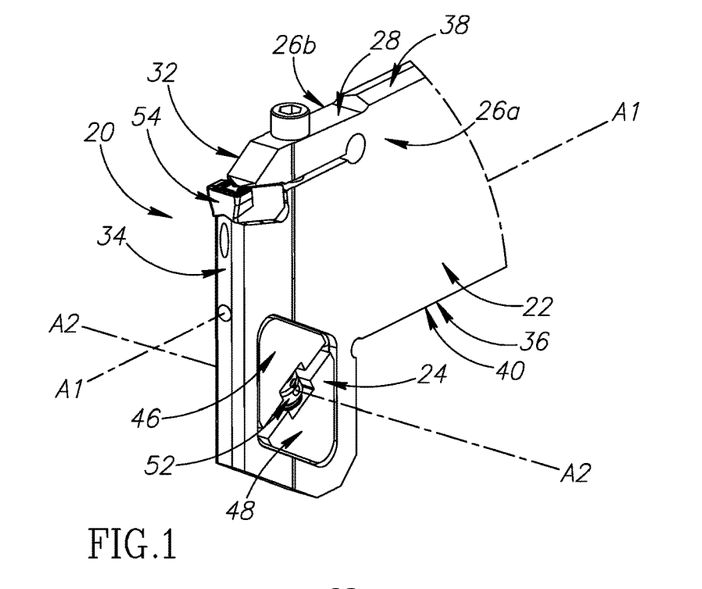
FIG. 1 is a perspective view of a cutting tool holder in accordance with some embodiments of the present invention.
Figure 2:
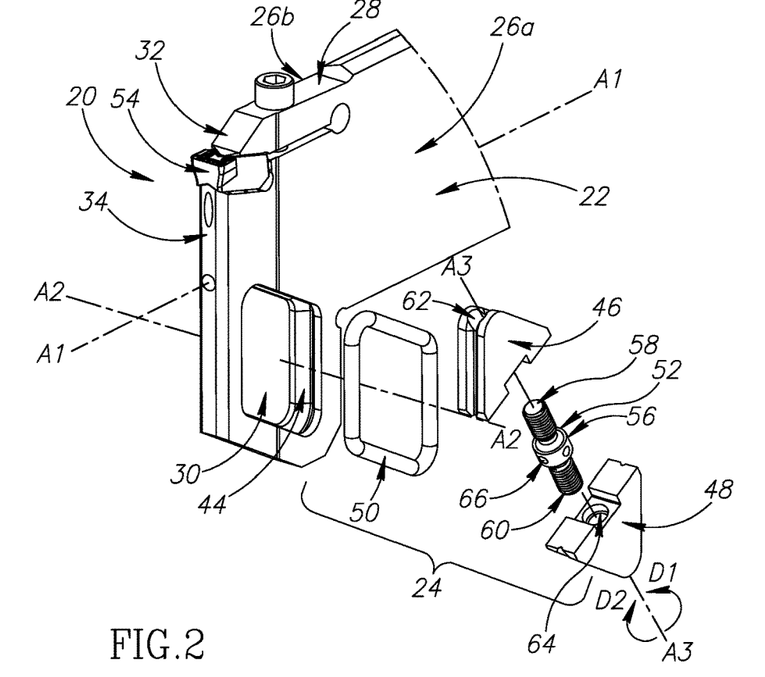
FIG. 2 is a partially exploded perspective view of the cutting tool holder shown in FIG. 1.

As shown in FIGS. 1 and 2, the holder body 22 has opposing first and second side surfaces 26a, 26b and a top surface 28 extending therebetween, and with the weight aperture 30 opening out to the first and second side surfaces 26a, 26b. The weight assembly 24 is located within the weight aperture 30.

Figure 3:
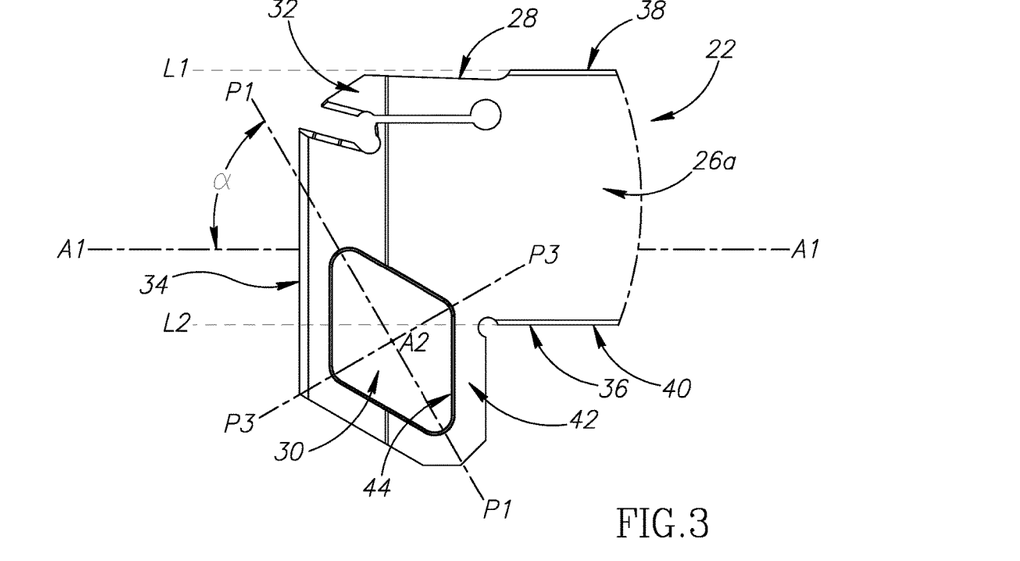
FIG. 3 is a side view of a holder body in accordance with some embodiments of the present invention.

In some embodiments of the present invention, as shown in FIG. 3, in a side view of the holder body 22, the weight aperture 30 may have a non-circular shape.

Also in some embodiments of the present invention, as shown in FIG. 3, in a side view of the holder body 22, the weight aperture 30 may have a generally parallelogrammatic shape.

As shown in FIGS. 1 to 4, an insert mounting portion 32 is located at a front end 34 of the holder body 22 adjacent to the top surface 28.

In some embodiments of the present invention, the holder body 22 may include a bottom surface 36 extending between the first and second side surfaces 26a, 26b opposite the top surface 28.

Figure 4:
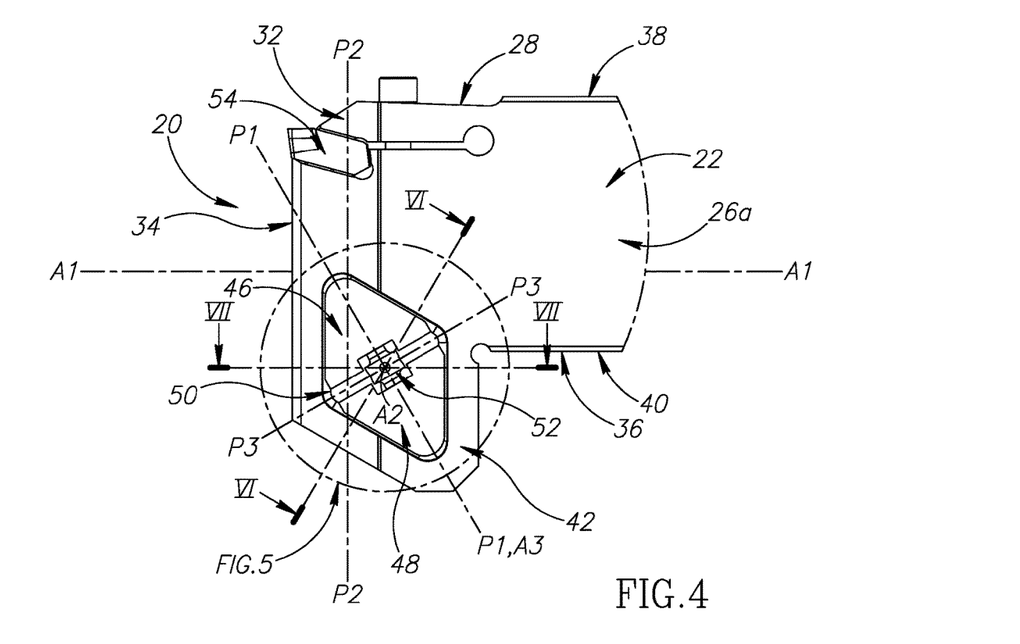
FIG. 4 is a side view of the cutting tool holder shown in FIG. 1.

As shown in FIGS. 3 and 4, the top and bottom surfaces 28, 36 may include upper and lower abutment surfaces 38, 40, respectively, extending parallel to the longitudinal axis A1, facilitating assembly of the cutting tool holder 20 into an elongated tool block (not shown) having parallel extending retaining grooves.

As shown in FIGS. 2 and 3, the weight aperture 30 may be located adjacent to the front end 34 of the holder body 22.

In some embodiments of the present invention, the weight aperture 30 may be at least partially located in a bottom protuberance 42 extending downwardly from the lower abutment surface 40.

As shown in FIG. 3, in a side view of the holder body 22, the upper and lower abutment surfaces 38, 40 may define parallel first and second imaginary straight lines L1, L2, respectively, and the second imaginary straight line L2 may intersect the weight aperture 30.

The provision of the bottom protuberance 42 enables the weight aperture 30 and the insert mounting portion 32 to be sufficiently spaced apart, so that the elongated holder body 22 retains an adequately high level of stiffness.

As shown in FIGS. 2 and 3, the weight aperture 30 has an aperture inner surface 44, and an aperture axis A2 extending transversely to the longitudinal axis A1.

In some embodiments of the present invention, as shown in FIG. 3, the weight aperture 30 may exhibit mirror symmetry about a first plane P1 containing the aperture axis A2.

As shown in FIG. 3, in a side view of the holder body 22, the aperture axis A2 may be located below the second imaginary line L2.

In some embodiments of the present invention, as shown in FIG. 3, the first plane P1 may form an acute aperture angle α with the longitudinal axis A1 and not intersect the top surface 28.

Also in some embodiments of the present invention, the aperture angle α may have a value of greater than 25° and less than 65°.

According to one embodiment of the present invention, as shown in FIGS. 1, 2 and 4, the weight assembly 24 comprises:

a first weight portion 46;
a second weight portion 48;
a damping ring 50 located along the aperture inner surface 44; and
an actuating member 52 interfacing and urging the first and second weight portions 46, 48 away from one another, towards the aperture inner surface 44, such that each weight portion 46, 48 presses against the damping ring 50 within the weight aperture 30.

In some embodiments of the present invention, the first and second weight portions 46, 48 may be formed of a material denser than the material of the holder body 22.

For example, if the holder body 22 is formed of steel, the first and second weight portions 46, 48 may be formed of hard metal, tungsten, and the like.

Also in some embodiments of the present invention, the damping ring 50 may be formed of an elastic compressible material, such as rubber.

As shown in FIGS. 1, 2 and 4, a cutting insert 54 is retained in the insert mounting portion 32 of the holder body 22, for performing cutting operations on a workpiece, e.g., turning, grooving or parting.

During such cutting operations with long overhangs, the holder body 22 may be prone to vibrations and chatter, which disturbs the engagement of the cutting insert 54 with the workpiece, and which may damage the cutting operation or the surface quality of the workpiece.

In order to reduce or eliminate such unwanted vibrations and chatter, the weight assembly 24 acts as a Dynamic Vibration Absorber (DVA) or a Tuned Mass Damper (TMD) for the holder body 22, by increasing the weight of its front end 34, wherein the damping ring 50 acts as a spring and the weight portions 46, 48 act together as the damping mass. The weight assembly 24 may thus be referred to as a vibration damping weight assembly 24. Vibrations of the holder body 22 are transferred through the damping ring 50 to the weight portions 46, 48, which, in turn, counteract to damp the vibrations of the holder body 22.

Figure 5:
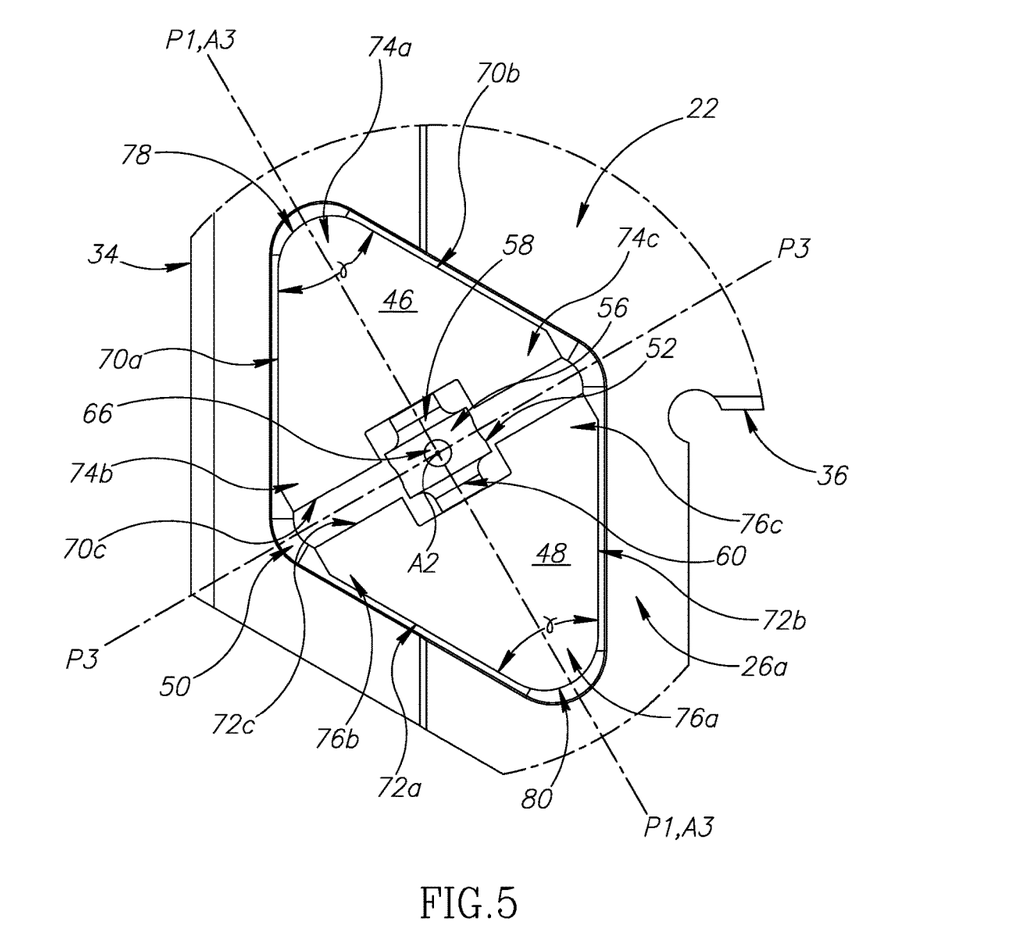
FIG. 5 is a detailed view of the cutting tool holder shown in FIG. 4.

As shown in FIGS. 4 and 5, each of the first and second weight portions 46, 48 may exhibit mirror symmetry about the first plane P1. It is noted that the first and second weight portions 46, 48 may not be necessarily identical, and may differ in weight or thickness.

As shown in FIG. 2, the damping ring 50 may be an O-ring, suitable for location along the aperture inner surface 44 of the non-circular shaped weight aperture 30.

As shown in FIG. 4, a second plane P2 perpendicular to the longitudinal axis A1 may intersect the cutting insert 54 and at least one of the first and second weight portions 46, 48.

In some embodiments of the present invention, the second plane P2 may intersect the cutting insert 54 and both of the first and second weight portions 46, 48.

Locating the weight assembly 24 adjacent to the front end 34 of the holder body 22 such that the second plane P2 intersects at least one of the first and second weight portions 46, 48, increases the weight of the front end 34 which thus improves the damping performance of the weight assembly 24.

In some embodiments of the present invention, the actuating member 52 may be rotatable about an actuating axis A3 contained in the first plane P1.

As shown in FIGS. 4 and 5, the actuating axis A3 may be perpendicular to aperture axis A2.

In some embodiments of the present invention, the actuating member 52 may comprise a central portion 56 located between two cylindrical-shaped end portions 58, 60.

As shown in FIG. 2, a first of the two end portions 58 may engage a first bore 62 in the first weight portion 46, and a second of the two end portions 60 may engage a second bore 64 in the second weight portion 48.

In some embodiments of the present invention, the actuating axis A3 may be coaxial with the first and second bores 62, 64.

Also in some embodiments of the present invention, at least one of the first and second end portions 58, 60 may threadingly engage the respective first and second bores 62, 64.

Further in some embodiments of the present invention, the two end portions 58, 60 may have threads of opposite hand, and both of the first and second end portions 58, 60 may threadingly engage the respective first and second bores 62, 64.

Yet further in some embodiments of the present invention, the central portion 56 may include a socket 66, or other means of rotation.

When the actuating member 52 is rotated in a first direction D1 about the actuating axis A3, the first and second weight portions 46, 48 move away from one another and the damping ring 50 is elastically compressed against the aperture inner surface 44.

In this tightened position, the first and second weight portions 46, 48 are floating within the weight aperture 30, and apart from interfacing with the actuating member 52, the first and second weight portions 46, 48 are only in contact with the damping ring 50.

As shown in FIGS. 4 and 5, the first and second weight portions 46, 48 do not contact the aperture inner surface 44.

In this manner, the damping ring 50 is restrained between the first and second weight portions 46, 48 and the aperture inner surface 44. Thus, the entire weight assembly 24 is restrained within the weight aperture 30, prevented from falling out therefrom.

When the actuating member 52 is rotated in a second direction D2 about the actuating axis A3, opposite to the first direction D1, the first and second weight portions 46, 48 move towards one another and the pressure applied on the damping ring 50 is reduced.

The amount to which the actuating member 52 is rotated in the first or second directions D1, D2 about the actuating axis A3 affects the amount to which the damping ring 50 is elastically compressed against the aperture inner surface 44. This also affects the extent of contact between the first and second weight portions 46, 48 and the damping ring 50, and between the damping ring 50 and the aperture inner surface 44. In the DVA aspect of the weight assembly 24, this fine tuning determines the spring constant of the damping ring 50.

Continued rotation of the actuating member 52 in the second direction D2 about the actuating axis A3, reduces the distance between the first and second weight portions 46, 48 until no pressure is applied on the damping ring 50, and the first and second weight portions 46, 48 and the actuating member 52 may be easily removed from the weight aperture 30, and replaced by other weight portions, as required. This flexibility is an advantage over other vibration damping weights which are fixedly coupled to the holder body, for example, by soldering or brazing, with no option of disassembly or replacement of the weights.

As shown in FIG. 3, the weight aperture 30 may exhibit mirror symmetry about a third plane P3 containing the aperture axis A2 and perpendicular to the first plane P1. Since weight aperture 30 exhibits mirror symmetry about two planes P1, P3 which are perpendicular to each other, the aperture axis A2 at the intersection of planes P1, P3 defines the geometric center of the weight aperture 30, which may be below the second imaginary line L2.

As shown in FIGS. 4 and 5, the first and second weight portions 46, 48 may be entirely located on opposite sides of the third plane P3.

In some embodiments of the present invention, an inner groove 68 may continuously extend along the aperture inner surface 44, and the damping ring 50 may interface with the inner groove 68.

Figure 6:
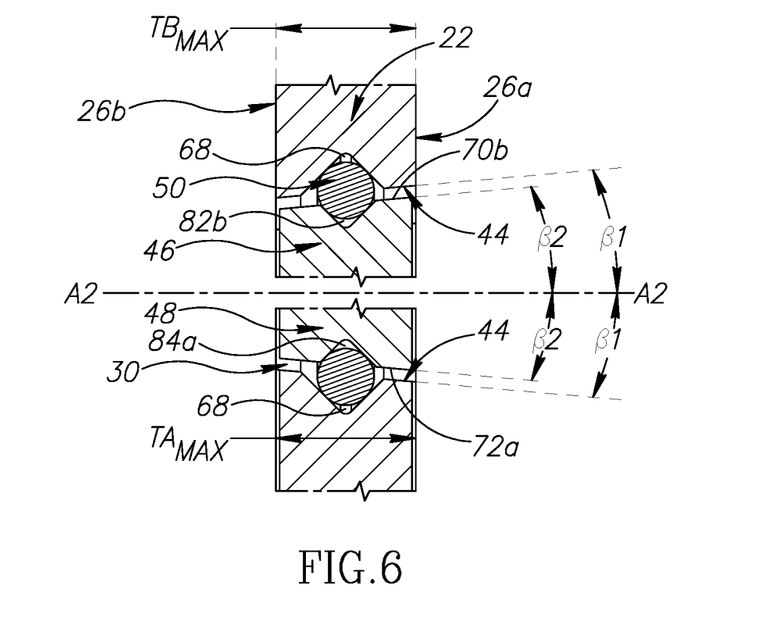
FIG. 6 is a cross-sectional view of the cutting tool holder shown in FIG. 4, taken along the line VI-VI.
Figure 7:
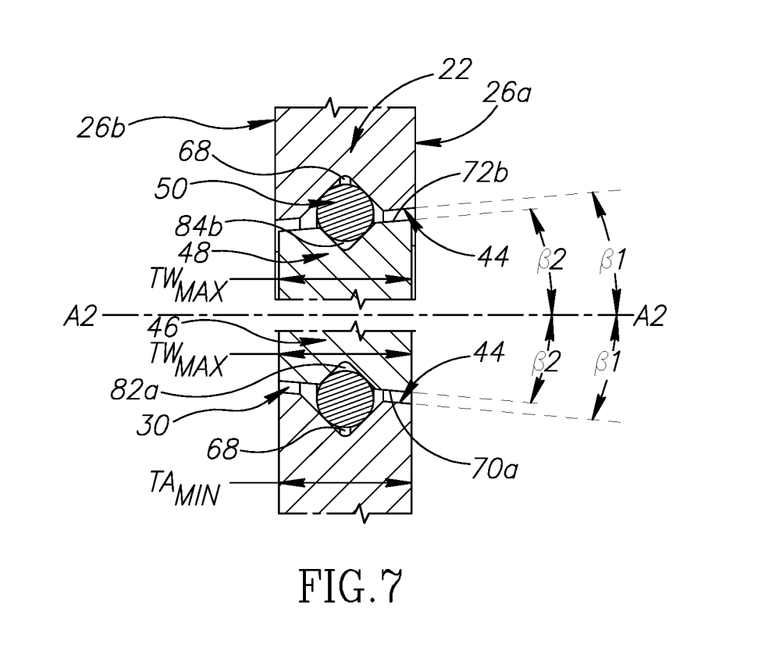
FIG. 7 is a cross-sectional view of the cutting tool holder shown in FIG. 4, taken along the line VII-VII.

As shown in FIGS. 6 and 7, the inner groove 68 may be V-shaped when viewed in a cross-section containing the aperture axis A2.

Also as shown in FIGS. 6 and 7, the aperture inner surface 44 may be inclined at a first slope angle β1 with respect to the aperture axis A2, to aid removal and replacement of the weight assembly 24.

In some embodiments of the present invention, the first slope angle β1 may have a value of less than 15°.

As shown in FIG. 5, in a side view of the cutting tool holder 20, both of the first and second weight portions 46, 48 may have a triangular shape, defined by three peripheral surfaces 70a, 70b, 70c; 72a, 72b, 72c extending between three corners 74a, 74b, 74c; 76a, 76b, 76c.

Also as shown in FIG. 5, first and second peripheral surfaces 70a, 70b; 72a, 72b diverging away from respective first corners 74a, 76a of the first and second weight portions 46, 48 may form acute first corner angles γ, and the first plane P1 may bisect each of the first corners 74a, 76a.

In some embodiments of the present invention, each of the first corners 74a, 76a may have a curved corner peripheral surface 78, 80 located between the associated first and second peripheral surfaces 70a, 70b; 72a, 72b.

The weight of the weight assembly 24, and in particular the weight of each of the first and second weight portions 46, 48, as well as the shape and dimension of the first and second weight portions 46, 48, are determined according to the shape and dimensions of the holder body 22, and according to the cutting operations to be performed with the cutting tool holder 20. The characteristics of the weight assembly 24 may change in different cutting tool holders. Alternatively, the cutting tool holder 20 may be used with different weight assemblies 24.

In some embodiments of the present invention, first and second outer grooves 82a, 82b; 84a, 84b may extend along the first and second peripheral surfaces 70a, 70b; 72a, 72b, respectively, of both of the first and second weight portions 46, 48, and the damping ring 50 may interface with each of the first and second outer grooves 82a, 82b; 84a, 84b.

As shown in FIGS. 6 and 7, each of the first and second outer grooves 82a, 82b; 84a, 84b may be V-shaped when viewed in a cross-section containing the aperture axis A2.

Also as shown in FIGS. 6 and 7, each of the first and second peripheral surfaces 70a, 70b; 72a, 72b may be inclined at a second slope angle β2 with respect to the aperture axis A2

In some embodiments of the present invention, the second slope angle β2 may be equal to the first slope angle β1.

Further as shown in FIGS. 6 and 7, each of the first and second weight portions 46, 48 may have a maximum weight thickness $TW_{MAX}$ in the direction of the aperture axis A2, and the maximum weight thickness $TW_{MAX}$ may be less than or equal to the minimum thickness $TA_{MIN}$ of the holder body 22 at the weight aperture 30, so that the weight assembly 24 does not protrude beyond the first and second side surfaces 26a, 26b.

In some embodiments of the present invention, the holder body 22 may be blade-shaped, having a maximum body thickness $TB_{MAX}$ between the first and second side surfaces 26a, 26b equal to the maximum thickness $TA_{MAX}$ of the holder body 22 at the weight aperture 30.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A cutting tool holder (20), comprising:
   a holder body (22) having a longitudinal axis (A1), and comprising:
   opposing first and second side surfaces (26a, 26b) and a top surface (28) extending therebetween;
   an insert mounting portion (32) located at a front end (34) of the holder body (22) adjacent to the top surface (28);
   a weight aperture (30) opening out to the first and second side surfaces (26a, 26b) and comprising an aperture inner surface (44), and an aperture axis (A2) extending transversely to the longitudinal axis (A1); and
   a weight assembly (24) located within the weight aperture (30), and comprising:
   a first weight portion (46);

a second weight portion (48);
a damping ring (50) located along the aperture inner surface (44); and
an actuating member (52) interfacing and urging the first and second weight portions (46, 48) away from one another, such that each weight portion (46, 48) presses against the damping ring (50) within the weight aperture (30).

2. The cutting tool holder (20) according to claim 1, wherein in a side view of the holder body (22), the weight aperture (30) has a non-circular shape.

3. The cutting tool holder (20) according to claim 1, wherein:
each of the first and second weight portions (46, 48) has a maximum weight thickness (TWMAX) in the direction of the aperture axis (A2); and
the maximum weight thickness (TWMAX) is less than or equal to the minimum thickness (TAMIN) of the holder body (22) at the weight aperture (30).

4. The cutting tool holder (20) according to claim 1, wherein:
the actuating member (52) comprises a central portion (56) located between two cylindrical-shaped end portions (58, 60);
a first of the two end portions (58) engages a first bore (62) in the first weight portion (46), and a second of the two end portions (60) engages a second bore (64) in the second weight portion (48); and
at least one of the first and second end portions (58, 60) threadingly engages the respective first and second bores (62, 64).

5. The cutting tool holder (20) according to claim 1, wherein the weight aperture (30) is located adjacent to the front end (34) of the holder body (22).

6. The cutting tool holder (20) according to claim 1, wherein the first and second weight portions (46, 48) are formed of a material denser than the material of the holder body (22).

7. The cutting tool holder (20) according to claim 1, wherein an inner groove (68) continuously extends along the aperture inner surface (44), and the damping ring (50) interfaces with the inner groove (68).

8. The cutting tool holder (20) according to claim 1, wherein:
the holder body (22) includes a bottom surface (36) extending between the first and second side surfaces (26a, 26b) opposite the top surface (28); and
the top and bottom surfaces (28, 36) include upper and lower abutment surfaces (38, 40), respectively, extending parallel to the longitudinal axis (A1).

9. The cutting tool holder (20) according to claim 8, wherein in a side view of the holder body (22):
the upper and lower abutment surfaces (38, 40) define parallel first and second imaginary straight lines (L1, L2), respectively; and
the second imaginary straight line (L2) intersects the weight aperture (30).

10. The cutting tool holder (20) according to claim 1, wherein the weight aperture (30) exhibits mirror symmetry about a first plane (P1) containing the aperture axis (A2).

11. The cutting tool holder (20) according to claim 10, wherein in a side view of the cutting tool holder (20), both of the first and second weight portions (46, 48) have a triangular shape, defined by three peripheral surfaces (70a, 70b, 70c; 72a, 72b, 72c) extending between three corners (74a, 74b, 74c; 76a, 76b, 76c).

12. The cutting tool holder (20) according to claim 11, wherein:
first and second peripheral surfaces (70a, 70b; 72a, 72b) diverging away from respective first corners (74a, 76a) of the first and second weight portions (46, 48) form acute first corner angles (γ), and
the first plane (P1) bisects each of the first corners (74a, 76a).

13. The cutting tool holder (20) according to claim 11, wherein:
first and second outer grooves (82a, 82b; 84a, 84b) extend along the first and second peripheral surfaces (70a, 70b; 72a, 72b), respectively, of both of the first and second weight portions (46, 48); and
the damping ring (50) interfaces with each of the first and second outer grooves (82a, 82b; 84a, 84b).

14. The cutting tool holder (20) according to claim 10, wherein the actuating member (52) is rotatable about an actuating axis (A3) contained in the first plane (P1).

15. The cutting tool holder (20) according to claim 10, wherein the weight aperture (30) exhibits mirror symmetry about a third plane (P3) containing the aperture axis (A2) and perpendicular to the first plane (P1).

16. The cutting tool holder (20) according to claim 15, wherein the first and second weight portions (46, 48) are entirely located on opposite sides of the third plane (P3).

17. A cutting tool holder (20) comprising:
a holder body (22) having a longitudinal axis (A1), and comprising:
opposing first and second side surfaces (26a, 26b);
a top surface (28) extending between first and second side surfaces (26a, 26b), and having an upper abutment surface (38);
a bottom surface (36) extending between the first and second side surfaces (26a, 26b) opposite the top surface (28), and having a lower abutment surface (40);
an insert mounting portion (32) located at a front end (34) of the holder body (22) adjacent to the top surface (28); and
a weight aperture (30) opening out to the first and second side surfaces (26a, 26b) and comprising an aperture inner surface (44), and an aperture axis (A2) extending transversely to the longitudinal axis (A1); wherein:
the weight aperture (30) is at least partially located in a bottom protuberance (42) which extends downwardly from the lower abutment surface (40); and
in a side view of the holder body (22):
the lower abutment surface (40) defines a second imaginary straight line (L2); and
the aperture axis (A2) defines a geometric center of the weight aperture (30), the geometric center being located below the second imaginary line (L2).

18. The cutting tool holder (20) according to claim 17, further comprising:
a weight assembly (24) located within the weight aperture (30), and comprising:
a first weight portion (46);
a second weight portion (48); and
an actuating member (52) interfacing and urging the first and second weight portions (46, 48) away from one another, towards the aperture inner surface (44).

19. The cutting tool holder (20) according to claim 18, wherein:

the weight assembly (24) further comprises a damping ring (50) located along the aperture inner surface (44); and the actuating member (52) urges the first and second weight portions (46, 48) away from one another, such that each weight portion (46, 48) presses against the damping ring (50) within the weight aperture (30).

20. The cutting tool holder (20) according to claim 17, wherein in a side view of the holder body (22):

the second imaginary straight line (L2) intersects the weight aperture (30).

21. A cutting tool holder (20), comprising:

a holder body (22) having a longitudinal axis (A1), and comprising:

opposing first and second side surfaces (26a, 26b) and a top surface (28) extending therebetween;

an insert mounting portion (32) located at a front end (34) of the holder body (22) adjacent to the top surface (28);

a non-circular weight aperture (30) opening out to the first and second side surfaces (26a, 26b) and comprising an aperture inner surface (44); and an aperture axis (A2) extending transversely to the longitudinal axis (A1); and a weight assembly (24) located within the non-circular weight aperture (30), the weight assembly comprising at least first and second weight portions (46, 48), each weight portion (46, 48) being urged in a different direction toward said aperture inner surface (44).

22. The cutting tool holder (20) according to claim 21, wherein the weight assembly further comprises:

a damping ring (50) located along the aperture inner surface (44); and an actuating member (52) interfacing and urging the first and second weight portions (46, 48) away from one another, such that each weight portion (46, 48) presses against the damping ring (50) within the weight aperture (30).

23. A cutting tool holder (20) comprising:

a holder body (22) having a longitudinal axis (A1), and comprising:

opposing first and second side surfaces (26a, 26b);

a top surface (28) extending between first and second side surfaces (26a, 26b), and having an upper abutment surface (38);

a bottom surface (36) extending between the first and second side surfaces (26a, 26b) opposite the top surface (28), and having a lower abutment surface (40);

an insert mounting portion (32) located at a front end (34) of the holder body (22) adjacent to the top surface (28); and a weight aperture (30) opening out to the first and second side surfaces (26a, 26b) and comprising an aperture inner surface (44), and an aperture axis (A2) extending transversely to the longitudinal axis (A1);

wherein:

the weight aperture (30) is at least partially located in a bottom protuberance (42) which extends downwardly from the lower abutment surface (40); and the upper and lower abutment surfaces (38, 40) extend parallel to each other and to the longitudinal axis (A1).

24. The cutting tool holder (20) according to claim 23, wherein the holder body (22) is blade-shaped, having a maximum body thickness ($TB_{MAX}$) between the first and second side surfaces (26a, 26b) equal to the maximum thickness ($TA_{MAX}$) of the holder body (22) at the weight aperture (30).

* * * * *